June 28, 1960 R. ROY 2,942,809
AIRCRAFT UNDERCARRIAGE LEG
Filed Nov. 9, 1956 3 Sheets-Sheet 3
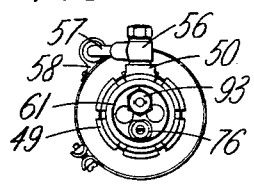
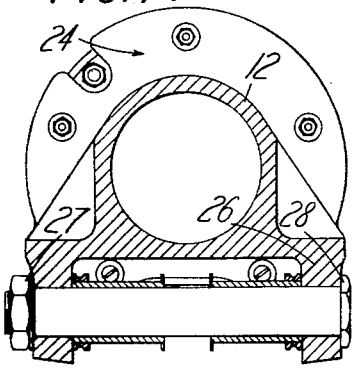
INVENTOR
ROBERT ROY
By
Watson, Cole, Grindle & Watson
ATTORNEYS

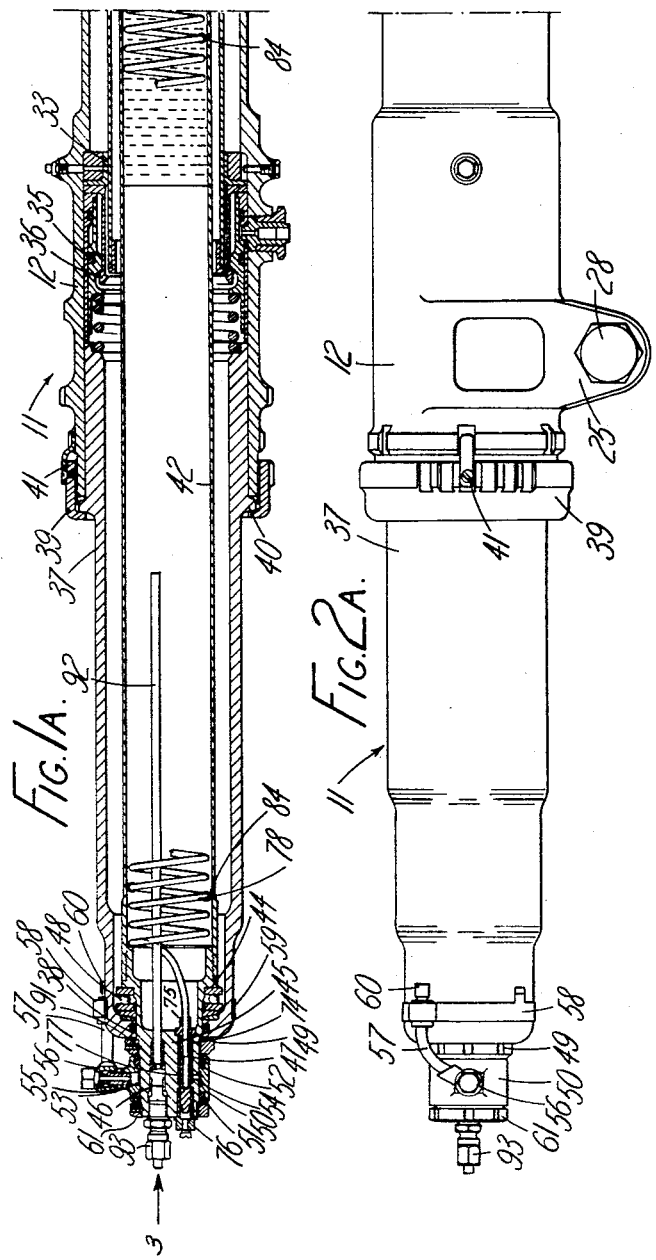

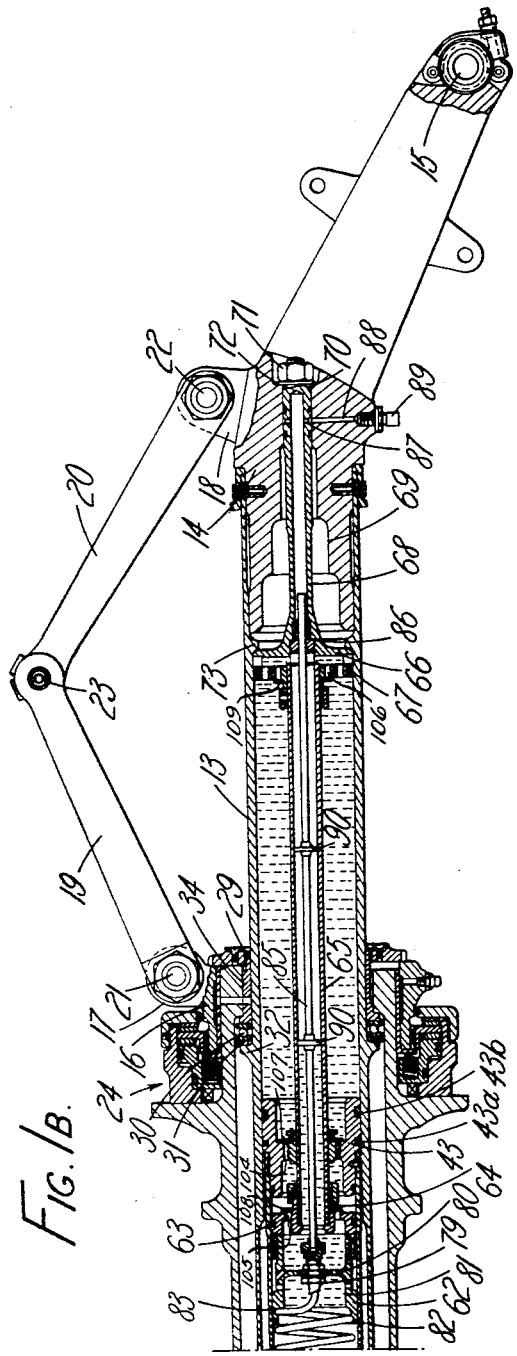

United States Patent Office 2,942,809
Patented June 28, 1960

2,942,809

AIRCRAFT UNDERCARRIAGE LEG

Robert Roy, Gloucester, England, assignor to British Messier Limited, Gloucester, England, a British company Filed Nov. 9, 1956, Ser. No. 621,295

Claims priority, application Great Britain Nov. 10, 1955

11 Claims. (Cl. 244—104)

This invention relates to brake operating means for the wheels of aircraft undercarriages, and is more particularly concerned with means for transmitting the fluid medium which is used for operating the brake from a pressure source to the brake.

On certain aircraft it is desirable to permit the wheel or wheels mounted upon one or more of the undercarriage struts or legs to castor freely with no angular limitation on the amount of castoring. Ordinarily in a non-castoring type of undercarriage the medium for operating the brake associated with an aircraft wheel which is mounted upon a leg, is conveyed to the brake through a flexible pipe which is mounted externally of the leg. The leg is arranged to telescope under landing loads, shock absorbing means being provided in the leg, and it is for this reason that a flexible brake pipe is required. Such an arrangement is however quite unsuitable for an undercarriage leg, part of which is required to castor freely along with the undercarriage wheel, since the external pipe would wind around the leg.

It is an object of this invention to provide an undercarriage leg arrangement which overcomes this difficulty.

According to the present invention an undercarriage leg for an aircraft comprises a cylindrical casing attached to the aircraft structure, a sliding tube supported coaxially in said casing such that it is telescopically displaceable with respect thereto, said sliding tube carrying at least one landing wheel, a coiled pipe extending within the leg, the coil being capable of axial expansion and contraction, and connections between one end of the coiled pipe and the cylindrical casing and the other end and the sliding tube such that a fluid medium delivered from a source outside the leg into said coiled pipe can be conveyed to the wheel brake or brakes.

According to a feature of the invention, the sliding tube is relatively rotatable about its longitudinal axis with respect to the casing, the coil of the coiled pipe is coaxial therewith, and the connection between either the coiled pipe and the casing or said pipe and the sliding tube comprises a rotary joint.

In the specific example hereinafter described the rotary joint is disposed at the upper end of the leg between the coiled pipe and the cylindrical casing.

Preferably said coiled pipe is housed within the hollow piston rod of a shock absorber incorporated in the leg and is connected at its lower end to a piston displaceable in said piston tube under landing loads, said sliding tube, coiled pipe, piston tube and piston together being relatively rotatable with respect to said cylindrical casing.

An embodiment of the invention will now be described by way of example with reference to the accompanying drawings in which:

Figures 1a and 1b show in cross-section a leg or strut arrangement for an aircraft undercarriage which incorporates a brake pipe according to the invention, Figures 2a and 2b show an external elevation of the above leg or strut arrangement, Figure 3 shows an end view on Figure 1a in the direction of the arrow 3, and Figure 4 shows a cross-section on Figure 2b on the line 4—4.

Referring to the drawings, the leg or strut generally indicated at 11 comprises a cylindrical casing 12 and a sliding tube 13 slidable partly within and with respect to the cylindrical casing. At the lower end (the right hand end in Figures 1b and 2b) of the sliding tube, there is fitted a bifurcated part 14 provided with a wheel carrying axle 15. A sleeve 16 is mounted upon the lower end of the cylindrical casing and retained thereon in any convenient manner such that it is rotatable with respect to the casing. Lugs 17 are provided integral with the sleeve and lugs 18 are provided integral with the bifurcated part 14. Triangular shaped torque links 19 and 20 are respectively pivotally connected at 21 and 22 to the lugs 17 and 18. Torque links 19 and 20 are themselves pivotally connected together at 23. The arrangement is such that sliding tube 13 is rotatable about its longitudinal axis with respect to cylindrical casing 12, the torque links 19 and 20 being rotatable with it by virtue of the relatively rotatable sleeve 16. Such rotation is however possible only when the hydraulic castor lock, generally indicated at 24 (but not described in detail) is inoperative. When the castor lock is operative the sleeve 16 becomes fixed with respect to the cylindrical casing 12 and therefore since the torque links connect the sleeve to the bifurcated part 14, the sliding tube 13 and wheel are also fixed against castoring.

The cylindrical casing 12 is provided with pairs of lugs 25 and 26 integral therewith. Nuts 27 and bolts 28 fitted in holes in these lugs secure the cylindrical casing to the framework of the aircraft fuselage (not shown).

Mounted within the cylindrical casing 12 at its lower end, adjacent the aperture 29 through which the sliding tube 13 extends, is a ball bearing 30. This ball bearing is retained in any convenient manner with respect to the casing, its upper race engaging a ring 31. When the sliding tube 13 is in its extended position a radial flange 32 formed on the exterior surface thereof, bears upon this ring and thus upon the bearing. When the sliding tube moves into the casing under load, the flange moves away from the bearing, the latter remaining fixed with respect to the casing. The sliding tube is arranged to slide in plain bearings 33 and 34 which are supported within the cylindrical casing, the first approximately midway along the casing and the second near its lower end.

Adjacent and above the plain bearing 33 the cylindrical casing houses a hydraulic telescopic lock, generally indicated at 35 which incorporates collet fingers 36 which, when the lock is operative, are hydraulically urged radially inwardly to hold the sliding tube 13 in the extended position by engaging the upper end thereof. The construction and operation of this lock are not described in detail as no novelty is claimed therein.

Secured to the upper end of cylindrical casing 12 is a tubular extension casing 37 open at its lower end and provided with an aperture 38 at its upper end. A flanged ring 39, bearing against a radial flange 40 formed on the exterior of the extension casing 37, screw-threadedly engaged with the upper end of cylindrical casing 12 and locked in any convenient manner as at 41, secures the extension casing 37 to the cylindrical casing.

Disposed coaxially within the sliding tube 13 and extending upwardly therefrom into the extension casing 37 is a piston rod in the form of a hollow tube 42. Secured to the lower end of the piston tube 42 is a main piston 43 (provided with sealing rings 43a and 43b) the diameter of which is slightly larger than that of the piston tube such that the sliding tube 13 is a sliding fit upon this piston. At its upper end the piston tube is stepped down at 44 to a reduced diameter end part 45 which extends through the aperture 38 in the extension casing 37, to the exterior thereof. The end part 45 is substantially solid but provided with two drilled holes 46 and 47, the axes of which are disposed about but parallel with the common axis of the strut. A ball bearing 48 is interposed between the step 44 and the end of the extension casing 37, the end part 45 being provided with a ring 49 secured thereto in any convenient manner to hold the step 44 of the piston tube against the lower race of the ball bearing so that the piston tube is supported but permitted to rotate with respect to the extension casing.

Above the ring 49 a ring member 50 is mounted upon the end part 45. Seals 51 and 52 are provided below and above an annular recess 53 formed in the bore of the ring member. This recess communicates through ports 54 in the end part 45 with the drilled hole 47. Leading from the recess 53 in the ring member 50 is a tapped hole 55 into which a banjo connection 56 is fitted. A fairly strong short steel pipe 57 opens at one end into the banjo connection and is held, near its other end, fast to the upper end of the extension casing by means of a strap member 58 located in a recess 59 in the extension casing. A screw-threaded portion 60 is provided at this end of the pipe to which the brake fluid supply pipe (not shown) is connected. A further ring 61 is secured in any convenient manner to the end part 45 above the ring member 50. Thus the ring member 50 is located axially between the rings 49 and 61, and is held stationary with respect to the cylindrical casing 12, the piston tube 42 and end part 45 being rotatable with respect to the extension casing 37 and the ring member 50.

A piston 62 incorporating a sealing ring 63 is provided within the piston tube 42 in sliding relation thereto, and a tubular projection 64 on its lower face is connected to a tube 65 coaxial therewith in any convenient manner. Secured to the lower end of this tube is a circular partition member 66 which is a close fit in the bore of sliding tube 13 and which is provided with a sealing ring 67. The circular member 66 is provided with a tubular stem 68 coaxial therewith and extending downwardly through a stepped bore 69 in the bifurcated part 14. The lower extremity of the stem 68 projects from the bore 69 and is screw-threaded at 70. A castellated nut 71 and washer 72 applied to this screw-threaded part retain the circular member 66 and tubular stem 68 such that the lower face of the circular member bears upon a radially inwardly-directed flange 73 formed in the bore of the sliding tube 13. Thus the piston 62, tube 65, circular member 66 and tubular stem 68 are all fixed with respect to the sliding tube 13, such that when the latter telescopes with respect to the cylindrical casing 12, these parts move with it.

A sleeve 74 closed at its upper end is fitted in the drilled hole 47 in the end part 45 and is retained therein by a flange 75 at its lower end and by a screw-threaded plug 76 engaging a screw-threaded part at its upper end. Ports 77 in the sleeve 74 place the interior thereof in communication through the ports 54, the annular recess 53, the banjo connection 56 and pipe 57 with the brake fluid supply pipe (not shown).

Secured in any convenient manner to the sleeve 74 is a metal pipe 78 which is coiled and which extends through the bore of the piston tube 42 being connected at its lowermost extremity to a union connection 79 mounted coaxially within the piston 62 upon a partition 80 which divides a bore 81 in the piston. The lowermost coiled part of the pipe 78 seats in a helical groove 82 formed in the upper part of bore 81 and against a step 83 formed in this bore. The diameter of the coil is a little smaller than the bore of the piston tube, the clearance being taken up by locating rings or beads 84 which are mounted upon the coiled pipe 78. These rings or beads may be of nylon or other material suitable to prevent binding and fretting of the coils one with another and against the bore of the piston tube 42.

Connected to the lower part of the union connection 79 is a straight pipe 85 which extends through the tube 65 and opens into the interior of the tubular stem 68 through a plug and sealing gland arrangement 86. Ports 87 in the wall of the lower part of the tubular stem 68 align with a channel 88 in the bifurcated part 14. This channel leads to a connection 89 from which a pipe (not shown) is taken to the wheel brake. The straight pipe 85 is provided with flanged rings 90 mounted thereon which fit the bore of tube 65 so that the pipe 85 is supported coaxially therein. The flanged rings 90 are suitably apertured to permit the passage of hydraulic fluid associated with the shock absorber through the tube 65.

The drilled hole 46 in the end part 45 houses a sleeve 91 to which a pipe 92 is secured in any convenient manner. This pipe extends part-way into the interior of the piston tube 42. A compressed air charging valve 93 is screw-threadedly engaged in the upper end of drilled hole 46. Above the piston 62 the piston tube 42 is partly filled with hydraulic fluid, and above this it is pressurised with compressed air through the charging valve 93.

The piston tube 42, piston 62, piston 43, tube 65, circular member 66 and sliding tube 13 together form a hydraulic-pneumatic spring shock absorber. The pistons 43 and 62 and the circular member 66 are provided with suitable orifices, respectively 104, 105, 106 and plate valves respectively 107, 108, 109, such that upon compression of the strut, damping is afforded through the orifices and against the pneumatic pressure in the piston tube. Controlled recoil is afforded through recoil orifices incorporated in the arrangement.

When compression of the undercarriage strut 11 occurs during landing, the sliding tube 13 moves upwardly in its bearings 33 and 34 into the cylindrical casing 12. The telescopic lock 35 and castor lock 24 are of course inoperative during landing. As the sliding tube 13 moves upwardly the flange 32 moves away from its associated ball bearing 30. The circular member 66, tube 65, straight pipe 85, and piston 62 move upwardly with the sliding tube. Thus the piston 62 slides upwardly in the piston tube 42 so that the coiled brake pipe 78 is compressed and its effective length shortened.

On touching down also, transverse loads will cause the wheel to castor and therefore sliding tube 13 will turn about its longitudinal axis in its bearings 33 and 34. Thus circular member 66, tube 65, straight pipe 85, piston 62 and coiled brake pipe 78 will turn also. Due to the friction between the sliding tube 13 and piston 43 and between piston 62 and piston tube 42, the piston tube will turn with the sliding tube and with respect to extension casing 37, upon its ball bearing 48. The end part 45 of the piston tube therefore turns with respect to the ring member 50. By virtue of the annular recess 53 in the ring member, a rotary joint is formed between the end part and the ring member, such that pressure fluid may be conveyed through pipe 57, banjo connection 56, annular recess 53, ports 54, ports 77 and the interior of sleeve 74, into the coiled brake pipe 78. Pressure fluid may pass therefrom through the straight pipe 85, ports 87, channel 88, connection 89 and a flexible pipe (not shown) to the wheel brake, whatever the angular position of the wheel may be.

When the aircraft is taxying along the ground or upon the deck of an aircraft carrier, the telescopic lock 35 may be applied, but the castor lock 24 will not be applied. The sliding tube 13 will then be fully extended and free to turn about its longitudinal axis in plain bearings 33 and 34 and upon the ball bearing 30, the coiled brake pipe 78 turning with it by virtue of the rotary joint afforded by ring member 50, so that the wheel may castor freely.

I claim:

1. An undercarriage leg for an aircraft comprising a cylindrical casing, a sliding tube supported coaxially in said casing to be telescopically displaceable with respect thereto said sliding tube extending downwardly out through the lower end of the casing and carrying landing wheel axle receiving means at its lower end, a main piston within the tube slidable axially as one with the casing and having a hollow piston rod extending upwardly out through the upper end of the tube and projecting through the upper end of the casing, a second piston slidable within the hollow rod of the main piston and itself having a hollow piston rod that extends downwardly through the sliding tube and is secured to the lower end thereof, the piston rod of the second piston passing slidably through an aperture in the main piston, a brake supply connection on the part of the main piston rod projecting above the casing, a further brake supply connection at the lower end of the sliding tube, and a brake pipe extending internally through the leg between the two brake connections said brake pipe having a straight portion within the piston rod of the second piston and extending up from the lower connection to said piston, and a coiled portion extending down through the main piston rod from the upper connection to the second piston, the coil being capable of axial expansion and contraction when the sliding tube and second piston slide relatively to the casing and main piston.

2. An undercarriage leg as claimed in claim 1, wherein anti-friction means are interposed between the cylindrical casing on the one hand and the sliding tube and main piston rod on the other, and the brake supply connection at the upper end of the leg comprises a rotary joint, to enable the landing wheel axle receiving means carried by the sliding tube to castor with respect to the casing.

3. An undercarriage leg as claimed in claim 2, wherein the rotary joint in the brake supply connection at the upper end of the leg comprises at least one radial port in the end of the rotary main piston rod, and a non-rotary ring surrounding said end and having an annular recess to make communication with said ports.

4. An undercarriage leg as claimed in claim 1, incorporating an oleo-pneumatic shock absorber comprising the sliding tube, the main piston and piston rod and the second piston and piston rod, the two pistons having damping orifices and the chamber in the sliding tube below the main piston and the piston rod of the second piston being filled with oil, while the main piston rod is partially filled with oil to a level above the second piston therein and has a compressed air chamber in its upper end above the oil.

5. An undercarriage leg as claimed in claim 4, wherein the lower end of the piston rod of the second piston is secured to a partition member across the interior of the lower end of the sliding tube, which partition member also has damping orifices.

6. An undercarriage leg for aircraft, comprising a cylindrical casing, a sliding tube supported coaxially in said casing so that it is telescopically displaceable with respect thereto, said sliding tube carrying landing wheel axle receiving means, a coiled pipe extending within the leg, said coiled pipe having a multiplicity of convolutions and being capable of axial expansion and contraction, the coils of said coiled pipe being coaxial with the casing, connections between one end of the coiled pipe and the cylindrical casing and the other end of the coiled pipe and the sliding tube, one of said connections comprising a rotary joint, and a fluid medium delivered from a source outside the leg into said coiled pipe being conveyed to an external connection on said sliding tube.

7. An undercarriage leg for aircraft, comprising a cylindrical casing, a sliding tube supported coaxially in said casing so that it is telescopically displaceable with respect thereto, said sliding tube carrying landing wheel axle receiving means, a coiled pipe extending within the leg, said coiled pipe having a multiplicity of convolutions and being capable of axial expansion and contraction, the coils of said coiled pipe being coaxial with the casing, a connection between one end of the coiled pipe and the sliding tube, and a rotary joint connecting the other end of the coiled pipe and the cylindrical casing so that a fluid medium delivered from a source outside the leg into said coiled pipe can be conveyed to an external connection on said sliding tube.

8. An undercarriage leg for aircraft, comprising a cylindrical casing, a sliding tube supported coaxially in said casing so that it is telescopically displaceable with respect thereto, said sliding tube carrying landing wheel axle receiving means, a telescopic piston-and-cylinder type shock absorber incorporated in the leg, the shock absorber piston having a piston rod in the form of a hollow tube, a second piston displaceable in said piston rod tube and in operative connection with said sliding tube, a coiled pipe extending within the hollow tube piston rod, said coiled pipe having a multiplicity of convolutions which are coaxial with said hollow tube piston rod and being capable of axial expansion and contraction, a rotary joint connecting the other end of the coiled pipe and the cylindrical casing, said sliding tube, coiled pipe, piston rod tube and second piston therein being rotatable together relative to the cylindrical casing, said undercarriage leg further comprising a connection between said coiled pipe and said cylindrical casing, an external connection on said sliding tube, and conduit means between said connections.

9. An undercarriage leg for an aircraft comprising a cylindrical casing attached to the aircraft structure, a sliding tube supported coaxially in said casing to be telescopically displaceable with respect thereto, said sliding tube extending downwardly out through the lower end of the casing and carrying at least one landing wheel at its lower end, a main piston within the tube slidable axially as one with the casing and having a hollow piston rod extending upwardly out through the upper end of the tube and projecting through the upper end of the casing, anti-friction means interposed between the cylindrical casing and the sliding tube and main piston rod, a second piston slidable within the hollow rod of the main position and having a hollow piston rod extending downwardly through the sliding tube and secured to the lower end thereof, the piston rod of the second piston passing slidably through an aperture in the main piston, a brake supply connection having a rotary joint on the part of the main piston rod projecting above the casing, a further brake supply connection at the lower end of the sliding tube, a brake pipe extending internally through the leg between the two brake connections, said brake pipe having a straight portion within the piston rod of the second piston and extending up from the lower connection to said piston, and a coiled portion extending down through the main piston rod from the upper connection to the second piston, the diameter of the brake pipe coil being of a size to provide a small clearance between said brake pipe and the internal surface of the main piston rod, the coil being capable of axial expansion and contraction when the sliding tube and second piston slide relatively to the casing and main piston, and locating means provided at intervals on the pipe coil to take up the clearance and prevent binding and fretting.

10. An undercarriage leg for aircraft, comprising a cylindrical casing, a sliding tube supported coaxially in said casing so that it is telescopically and rotatably displaceable with respect thereto, said sliding tube carrying landing wheel axle receiving means, releasable rotary locking means between said sliding tube and said casing for locking said sliding tube against rotation with respect to said casing, a coiled pipe extending within the leg, said coiled pipe having a multiplicity of convolutions and being capable of axial expansion and contraction, and connections between one end of the coiled pipe and the cylindrical casing, and the other end of the coiled pipe and the sliding tube so that a fluid medium delivered from a source outside the leg into said coiled pipe can be conveyed to an external connection on said sliding tube.

11. An undercarriage leg for aircraft, comprising a cylindrical casing, a sliding tube supported coaxially in said casing so that it is telescopically displaceable with respect thereto, said sliding tube carrying landing wheel axle receiving means, releasable axial lock means between said sliding tube and said casing to lock the leg in the fully extended condition, a coiled pipe extending within the leg, said coiled pipe having a multiplicity of convolutions and being capable of axial expansion and contraction, and connections between one end of the coiled pipe and the cylindrical casing, and the other end of the coiled pipe and the sliding tube so that a fluid medium from a source outside the leg into said coiled pipe may be conveyed to an external connection on said sliding tube.

References Cited in the file of this patent

UNITED STATES PATENTS

| | | |
|---|---|---|
| 2,355,026 | Koppen | Aug. 1, 1944 |
| 2,451,171 | Mullen | Oct. 12, 1948 |